United States Patent
Rao

(10) Patent No.: US 6,936,239 B2
(45) Date of Patent: Aug. 30, 2005

(54) PROCESS FOR THE PREPARATION OF DOPED PENTASIL-TYPE ZEOLITES USING DOPED FAUJASITE SEEDS

(75) Inventor: Rajeev S. Rao, Webster, TX (US)

(73) Assignee: Akzo Novel NV (NL)

(*) Notice: Subject to any disclaimer, the term of this patent is extended or adjusted under 35 U.S.C. 154(b) by 44 days.

(21) Appl. No.: 10/647,887

(22) Filed: Aug. 25, 2003

(65) Prior Publication Data

US 2004/0091420 A1 May 13, 2004

Related U.S. Application Data

(60) Provisional application No. 60/406,491, filed on Aug. 28, 2002.

(51) Int. Cl.$^7$ ............................................. C01B 39/36
(52) U.S. Cl. .................. 423/709; 423/DIG. 22; 423/DIG. 29; 423/DIG. 34
(58) Field of Search .................. 423/709, DIG. 22, 423/DIG. 29, DIG. 34

(56) References Cited

U.S. PATENT DOCUMENTS

| | | | |
|---|---|---|---|
| 4,650,655 A | 3/1987 | Chu et al. | 423/328 |
| 5,232,675 A | 8/1993 | Shu et al. | 423/328 |
| 5,248,643 A | 9/1993 | Patil et al. | 502/67 |
| 5,951,963 A | 9/1999 | He et al. | 423/713 |

FOREIGN PATENT DOCUMENTS

EP 0550917 A1 7/1993 ............ C01B/33/34

OTHER PUBLICATIONS

Chemical Abstract of Chinese Patent No. 1,332114, dated Jun. 28, 2001, Wang, Xiqing, et al, "Optimal–Oridnted Growth of MFI–Type Zeolite Crystals".
Chemical Abstract of Chinese Patent No. 1,187,460, dated Jul. 15, 1998, Wang, Dianzhong, et al, "Synthesis of Crystalline Silica–Based Molecular Sieves".
Chemical Abstract of Chinese Patent No. 1052290, dated Nov. 30, 1989, Su, Xingtian, et al, "High–Silicon Rare Earth–Containing Zeolites Having Five–Member Ring Structure and Their Synthesis".
International Search Report of corresponding PCT Application. No. PCT/EP03/09184, dated Nov. 27, 2003.
Chinese abstract 1058382, Jul. 23, 1990.

*Primary Examiner*—David Sample
(74) *Attorney, Agent, or Firm*—Louis A. Morris

(57) ABSTRACT

Process for the preparation of doped pentasil-type zeolite, which process comprises the steps of:
  a) preparing an aqueous precursor mixture comprising a silicon source, an aluminum source, doped faujasite seeds, and another type of seeding material, and
  b) thermally treating the precursor mixture to form a doped pentasil-type zeolite.

This process results in doped pentasil-type zeolites in a shorter crystallization time compared to prior art processes.

9 Claims, No Drawings

PROCESS FOR THE PREPARATION OF DOPED PENTASIL-TYPE ZEOLITES USING DOPED FAUJASITE SEEDS

CROSS REFERENCE TO RELATED APPLICATION

This application claims priority from U.S. application Ser. No. 60/406,491, filed Aug. 28, 2002.

BACKGROUND OF THE INVENTION

1. Field of the Invention

The present invention relates to the preparation of doped pentasil-type zeolites using doped faujasite seeds.

2. Prior Art

U.S. Pat. No. 5,232,675 discloses a process for the preparation of rare earth metal (RE)-doped pentasil-type zeolites using RE-doped faujasite seeds. The process involves the steps of dispersing the RE-doped faujasite seeds in a gel system comprising water glass, aluminum salt, inorganic acid, and water, and crystallising the resulting mixture at a temperature of 30–200° C. for 12–60 hours.

The present invention provides a process for the preparation of rare earth metal-doped pentasil-type zeolites which requires a shorter crystallization time than the prior art process.

SUMMARY OF THE INVENTION

In one embodiment, the process of the invention comprises the steps of:
a) preparing an aqueous precursor mixture comprising a silicon source, an aluminum source, doped faujasite seeds, and another type of seeding material, and
b) thermally treating the precursor mixture to form a doped pentasil-type zeolite.

Other embodiments of the invention encompass details concerning precursor mixture compositions and process steps, all of which will be hereinafter discussed in detail.

DETAILED DESCRIPTION OF THE INVENTION

The process of the invention requires the use of doped faujasite seeds. Examples of faujasite seeds are zeolite X and (ultrastabilized) zeolite Y.

The term "doped faujasite seeds" refers to faujasite seeds containing an additive (also called dopant). Suitable dopants include compounds comprising rare earth metals such as Ce or La, alkaline earth metals such as Mg, Ca, and Ba, transition metals such as Zr, Mn, Fe, Ti, Cu, Ni, Zn, Mo, W, V, and Sn, actinides, noble metals such as Pt and Pd, gallium, boron, and/or phosphorus. Suitable compounds are the oxides, hydroxides, carbonates, hydroxycarbonates, chlorides, nitrates, sulfates, and phosphates of the above elements.

The dopant is present in the faujasite seed in amounts of 1–50 wt %, preferably 1–25 wt %, more preferably 5–20 wt %, and most preferably 10–20 wt %, calculated as oxide and based on the dry weight of the doped faujasite seeds.

Doped faujasite seeds can be prepared by, e.g., ion-exchange, impregnation, and solid state exchange of the faujasite seeds with the dopant. These procedures are well-known to the skilled person.

Furthermore, at least one other type of seeding material is used in the process. The term "other type of seeding material" refers to templates or seeds other than doped faujasite seeds. Suitable other types of seeding materials include pentasil-type seeds (e.g. ZSM-5 seeds, ZSM-11 seeds, zeolite beta seeds, etc.), any other type of seed or template generally applied in ZSM-5 synthesis, such as sols or gels containing an organic directing template such as tetrapropyl ammonium hydroxide (TPAOH) or tetrapropyl ammonium bromide (TPABr). An example of such a template-containing sol is a Si—Al sol containing 0.1–10 wt % of tetrapropyl ammonium bromide.

If desired, the other type of seeding material is doped. Suitable dopants include compounds comprising rare earth metals such as Ce and La, alkaline earth metals such as Mg, Ca, and Ba, transition metals such as Mn, Fe, Ti, Zr, Cu, Ni, Zn, Mo, W, V, and Sn, actinides, noble metals such as Pt and Pd, gallium, boron, and/or phosphorus.

The optional dopant(s) present in the other type of seeding material can be the same as or different from the dopant(s) present in the doped faujasite seeds.

The pentasil-type zeolite resulting from the process according to the invention preferably has a $SiO_2/Al_2O_3$ ratio (SAR) of 25–90. Typical examples of pentasil-type zeolites are ZSM-type zeolites, such as ZSM-5, ZSM-11, ZSM-12, ZSM-22, ZSM-23, and ZSM-35, zeolite beta, and zeolite boron beta. The doped pentasil-type zeolite preferably contains 0.1–10 wt %, more preferably 0.1–3 wt %, and most preferably 0.5–2.5 wt % of dopant, calculated as oxide and based on the total dry weight of the doped zeolite.

The first step of the process according to the invention involves the preparation of an aqueous precursor mixture comprising a silicon source, an aluminum source, doped faujasite seeds, and at least one other type of seeding material.

Suitable aluminum sources include aluminum salts, such as $Al_2(SO_4)_3$, $AlCl_3$, $AlPO_4$, $Al_2(HPO_4)_3$, and $Al(H_2PO_4)_3$, and water-insoluble aluminum compounds, e.g., aluminum trihydrate ($Al(OH)_3$) such as gibbsite and bauxite ore concentrate (BOC), thermally treated aluminum trihydrate such as flash-calcined aluminum trihydrate, (pseudo)boehmite, aluminum chlorohydrol, aluminum nitrohydrol. Also mixtures of one or more of these aluminum sources can be used.

Alternatively, doped aluminum sources can be used. Examples of such doped aluminum sources are doped (pseudo)boehmite and doped aluminum trihydrate.

Doped aluminum sources can be obtained by preparing the aluminum source in the presence of a dopant, impregnating the aluminum source with a dopant, or ion-exchanging the aluminum source with a dopant.

Doped (pseudo)boehmite for instance can be prepared by hydrolysis of aluminum alkoxide in the presence of a dopant, hydrolysis and precipitation of aluminum salts in the presence of a dopant, or by aging a slurry of (thermally treated) aluminum trihydrate, amorphous gel alumina, or less crystalline (pseudo)boehmite in the presence of a dopant. For more information concerning the preparation of doped (pseudo)boehmite reference is made to International Patent Application Nos. WO 01/12551, WO 01/12552, and WO 01/12554.

Suitable silicon sources include sodium silicate, sodium meta-silicate, stabilized silica sols, silica gels, polysilicic acid, tetra ethylortho silicate, fumed silicas, precipitated silicas, and mixtures thereof. Also doped silicon sources can be used. Doped silicon sources can be obtained by preparing the silicon source in the presence of a dopant, impregnating the silicon source with a dopant, or ion-exchanging the silicon source with a dopant.

Doped silica sol for instance can be prepared by preparing a silica sol from water glass and acid (e.g. sulfuric acid) and exchanging the sodium ions with the desired dopant. Alternatively, water glass, acid (e.g. sulfuric acid), and dopant are coprecipitated to form a doped silica sol.

Suitable dopants for the aluminum and/or the silicon source include compounds comprising rare earth metals such as Ce and La, alkaline earth metals such as Mg, Ca, and Ba, transition metals such as Mn, Fe, Ti, Zr, Cu, Ni, Zn, Mo, W, V, and Sn, actinides, noble metals such as Pt and Pd, gallium, boron, and/or phosphorus.

The optional dopant(s) present in the silicon and/or the aluminum source and the dopant in the doped faujasite seeds can be the same or different.

The precursor mixture preferably contains 0.1–10 wt %, more preferably 0.5–10 wt % of doped faujasite seeds and preferably 1–10 wt %, more preferably 1–5 wt % of the other type of seeding material, based on dry weight of the precursor mixture.

The amounts of silicon and aluminum source present in the precursor mixture depend on the desired SAR of the resulting doped pentasil-type zeolite.

If so desired, several other compounds may be added to the precursor mixture, such as metal (hydr)oxides, sols, gels, pore regulating agents (sugars, surfactants), clays, metal salts, acids, bases, etc.

Furthermore, it is possible to mill the precursor mixture.

The second step of the process involves thermal treatment of the precursor mixture at temperatures ranging from 130 to 200° C., preferably 150–180° C., for 3–60 hrs, preferably 1–11 hrs, and most preferably 3–8 hrs. During this step, the doped pentasil-type zeolite is formed by crystallization.

The thermal treatment can be conducted in one or more reaction vessels. If more than one such vessel is used, the process is preferably conducted in a continuous mode. Using more than one reaction vessel further makes it possible to prepare the aqueous precursor mixture either by adding all ingredients to the first vessel, or by dividing the addition of (part of the total amount of) the ingredients over the reaction vessels.

The precursor mixture of step a) or the doped pentasil-type zeolite resulting from step b) can be shaped to form shaped bodies. Suitable shaping methods include spray-drying, pelletising, extrusion (optionally combined with kneading), beading, or any other conventional shaping method used in the catalyst and absorbent fields or combinations thereof.

When shaping the precursor mixture of step a), the amount of liquid present in the precursor mixture should be adapted to the specific shaping step to be conducted. It may be advisable to partially remove the liquid used in the precursor mixture and/or to add an additional or another liquid, and/or to change the pH of the precursor mixture to make the mixture gellable and thus suitable for shaping. Additives commonly used in the different shaping methods, e.g., extrusion additives, may be added to the precursor mixture used for shaping.

If so desired, the resulting doped pentasil-type zeolite may be calcined and optionally ion-exchanged.

The doped pentasil-type zeolite can be used in or as a catalyst composition or catalyst additive composition for, e.g. hydrogenation, dehydrogenation, catalytic cracking (FCC), and alkylation reactions.

EXAMPLES

Comparative Example 1

A precursor mixture was prepared by combining 2,007 g water glass, 208 g aluminum sulfate, 141 g of 98% $H_2SO_4$, 2,466 g water, and 45 g Y-zeolite seeds doped with 12 wt % RE (calculated as oxide).

The precursor mixture was treated at 170° C. at autogeneous pressure for 12 hours. The characteristics of the resulting pentasil-type zeolite are presented in Table 1 below.

This Example shows that Y zeolite as such can act as a seed for the nucleation of pentasil-type zeolites.

Comparative Example 2

Comparative Example 1 was repeated, except that the precursor mixture was treated at 170° C. for 6 hrs. The results are shown in Table 1 below.

This Example indicates that under these reaction conditions a crystallization time of 6 hrs is inadequate for the formation of significant amounts of pentasil-type zeolite.

Example 3

Comparative Example 2 was repeated, except that, in addition to the other compounds, 6.5 g of ZSM-5 seeds were added to the precursor mixture.

The characteristics of the resulting pentasil-type zeolite are also presented in Table 1. This Example clearly shows that the addition of another type of seed accelerates the crystallization. So, in the presence of this seed, a crystallization time of 6 hrs is adequate.

TABLE 1

|  | Comp. Example 1 | Comp. Example 2 | Example 3 |
|---|---|---|---|
| BET-surface area (m²/g) | 316 | 37 | 320 |
| Micropore volume (ml/g) | 0.1227 | 0.0116 | 0.1193 |
| % ZSM-5[1] | 85 | 6 | 83 |

[1]The % ZSM-5 refers to the relative crystallinity of the sample, which was determined by X-ray diffraction using copper K-alpha radiation. The sample's total net integrated intensity of the reflections within the 2θ-range of 20–25° was determined and compared with that of a monoclinic ZSM-5.

What is claimed is:

1. A Process for the preparation of doped pentasil-type zeolite comprising the steps of:
    a) preparing an aqueous precursor mixture comprising a silicon source, an aluminum source, doped faujasite seeds, and another type of seeding material comprising pentasil type seeds, and
    b) thermally treating the precursor mixture to form a doped pentasil-type zeolite.

2. The process of claim 1 wherein the doped pentasil-type zeolite is doped ZSM-5.

3. The process of claim 1 wherein the other type of seeding material is a sol or gel containing an organic directing template.

4. The process of claim 1 wherein the faujasite seeds are doped with a dopant selected from the group consisting of Ce, La, Mn, Fe, Ti, Zr, Cu, Ni, Zn, Mo, W, V, Sn, Pt, Pd, Ga, B, and P.

5. The process of claim 1 wherein the silicon source is selected from the group consisting of sodium silicate, sodium meta-silicate, stabilized silica sols, silica gels, polysilicic acid, tetra ethylortho silicate, fumed silicas, precipitated silicas, and mixtures thereof.

6. The process of claim 1 wherein the aluminum source is selected from the group consisting of $Al_2(SO_4)_3$, $AlCl_3$, $AlPO_4$, $Al_2(HPO_4)_3$, $Al(H_2PO_4)_3$, aluminum trihydrate (Al (OH)$_3$), thermally treated aluminum trihydrate, (pseudo) boehmite, aluminum chlorohydrol, aluminum nitrohydrol, and mixtures thereof.

7. The process of claim 1 wherein step b) is performed at a temperature in the range 150–180° C.

8. The process of claim 1 wherein step b) is performed for 3–8 hours.

9. The process of claim 1 wherein a shaping step is performed between steps a) and b).

* * * * *